United States Patent [19]

Nickens et al.

[11] Patent Number: 5,664,610
[45] Date of Patent: Sep. 9, 1997

[54] RUPTURE VESSEL WITH AUXILIARY PROCESSING VESSEL

[75] Inventors: Dan A. Nickens, Windermere; Charles C. Mattern, Cleremonte, both of Fla.; David R. Childers, Huntsville, Ala.

[73] Assignee: Earth Resources Corporation, Ocoee, Fla.

[21] Appl. No.: 289,202

[22] Filed: Aug. 12, 1994

Related U.S. Application Data

[63] Continuation-in-part of Ser. No. 70,709, May 28, 1993, Pat. No. 5,427,157.

[51] Int. Cl.$^6$ ...................................... B65B 31/00
[52] U.S. Cl. .................... 141/51; 141/1; 141/11; 141/97; 141/83; 141/330; 222/87
[58] Field of Search .................... 141/1, 4, 11, 51, 141/65, 83, 97, 329, 330; 222/87; 588/259

[56] References Cited

U.S. PATENT DOCUMENTS

| | | | |
|---|---|---|---|
| Re. 33,799 | 1/1992 | Gold et al. | 141/51 |
| 45,183 | 11/1864 | Sexton . | |
| 314,085 | 3/1885 | Norman . | |
| 572,786 | 12/1896 | Downey . | |
| 2,911,859 | 11/1959 | Longley et al. . | |
| 3,364,939 | 1/1968 | Valenziano . | |
| 3,495,615 | 2/1970 | Ehrens et al. . | |
| 3,821,965 | 7/1974 | Reynolds | 137/318 |
| 3,974,846 | 8/1976 | Serota . | |
| 3,983,756 | 10/1976 | Danguillier et al. . | |
| 3,995,655 | 12/1976 | Sands | 137/318 |
| 4,166,481 | 9/1979 | Farris et al. | 141/1 |
| 4,350,052 | 9/1982 | Kendall . | |
| 4,399,829 | 8/1983 | Schuler . | |
| 4,407,341 | 10/1983 | Feldt et al. | 141/97 |
| 4,475,566 | 10/1984 | Haines . | |
| 4,690,180 | 9/1987 | Gold | 141/51 |
| 4,944,333 | 7/1990 | Gold et al. | 141/51 |
| 4,966,317 | 10/1990 | Barr . | |
| 5,035,269 | 7/1991 | Pytryga et al. | 141/1 |
| 5,076,311 | 12/1991 | Marschke . | |
| 5,114,043 | 5/1992 | Collins, Jr. | 222/86 |
| 5,163,462 | 11/1992 | Leemput et al. . | |
| 5,163,483 | 11/1992 | Eckman | 141/1 |
| 5,174,344 | 12/1992 | Gonzalez-Miller et al. | 141/65 |
| 5,186,219 | 2/1993 | Gold et al. | 141/51 |
| 5,265,762 | 11/1993 | Campbell et al. | 222/5 |
| 5,269,352 | 12/1993 | Gold | 141/51 |
| 5,271,437 | 12/1993 | O'Brien et al. | 141/51 |
| 5,273,088 | 12/1993 | Cripe et al. | 141/329 |
| 5,275,214 | 1/1994 | Rehberger | 141/65 |
| 5,303,749 | 4/1994 | Stock et al. | 141/4 |
| 5,337,793 | 8/1994 | Gold et al. | 141/1 |
| 5,340,244 | 8/1994 | Hawley et al. | 408/87 |

FOREIGN PATENT DOCUMENTS

| | | |
|---|---|---|
| 950614 | 10/1956 | Germany . |
| 1607991 | 10/1970 | Germany . |

OTHER PUBLICATIONS

Department of the Army, Office of the AMC Program Manager for Demilitarization of Chemical Material, "Supplement C to Project Eagle—Phase II Demilitarization and Disposal of the M34 Cluster at Rocky Mountain Arsenal Final Plan" (Feb. 1973), pp. viii–ix, 15–21, IC–1, 2C–15.

Solkatronic Chemicals Inc., *Instruction Manual for Model 5502 Emergency Response Containment Vessel*, Oct. 1990.

(List continued on next page.)

*Primary Examiner*—J. Casimer Jacyna
*Attorney, Agent, or Firm*—Baker & Botts, L.L.P.

[57] ABSTRACT

A fluid recovery system and method for accessing the contents of a target container. A preferred embodiment of the fluid recovery system includes an auxiliary processing vessel for housing a container to be accessed, a cylinder rupture vessel for housing the auxiliary processing vessel, and a tapping assembly positioned within the cylinder rupture vessel for accessing the contents of a target container. One or more fluid seals may be formed. The use of the auxiliary processing vessel of the preferred embodiment provides an extra level of protection against exposure to the contents of the container.

37 Claims, 8 Drawing Sheets

OTHER PUBLICATIONS

American Petroleum Institute, "Procedures for Welding or Hot Tapping on Equipment Containing Flammables," API Publication 2201, Third Edition, Oct., 1985.

Memo, New Jersey State Department of Environmental Protection, Feb. 4, 1982, two pages.

"No Known Treatment For Accident Victim," *Sunday Times*, Trenton, New Jersey, Feb. 28, 1982, p. 87.

"This Stuff Is Getting To All Of Us!" *Fire Engineering*, Apr. 1983, pp. 21, 25–28.

"Poison Spills Impact Remains," *Richmond Times–Dispatch*, Mar. 16, 1983, pp. A1–A2.

"Pentaborane Release, Environmental Laboratories, Hanover County, VA," National Response Team Briefing, Mar. 1982, pp. 1–2.

Memo, CECOS International, Inc. to Environmental Emergency Branch, Mar. 17, 1982, pp. 1–5.

"Procedures For Welding or Hot Tapping On Equipment Containing Flammables," *American Petroleum Institute*, Publication 2201, Third Edition, Oct. 1985.

Excert From U.S. Army Material Destruction Agency, Generic Site Scoping Study Dec. 3, 1993.

"Somethin Out Of A Space Movie," *Richmond Times–Dispath*, Feb. 1982, A1–A2.

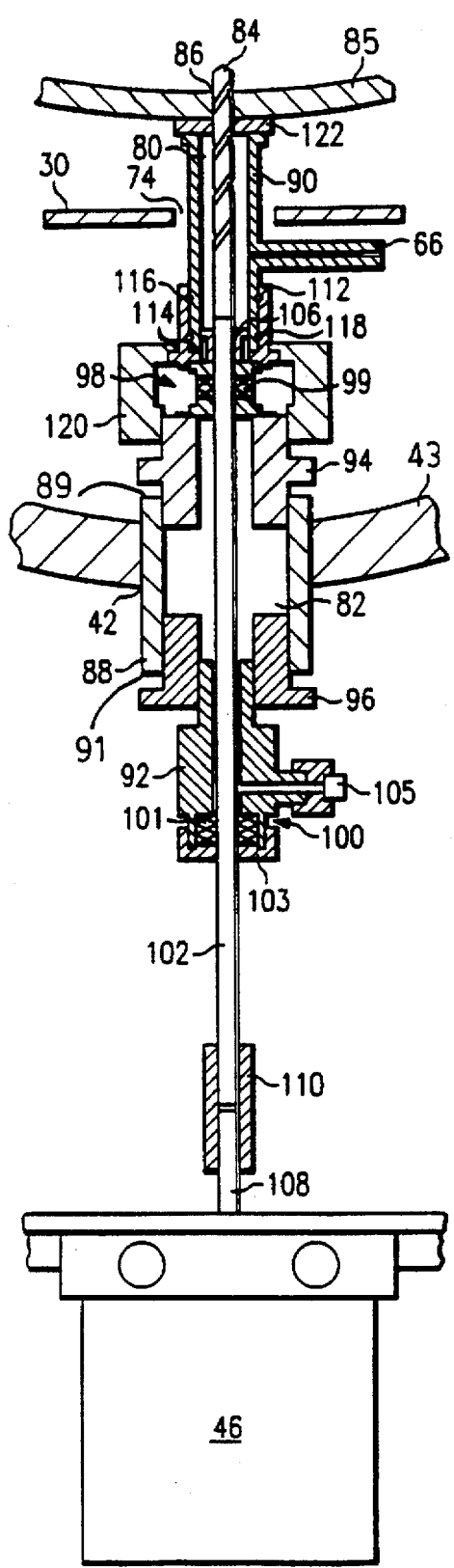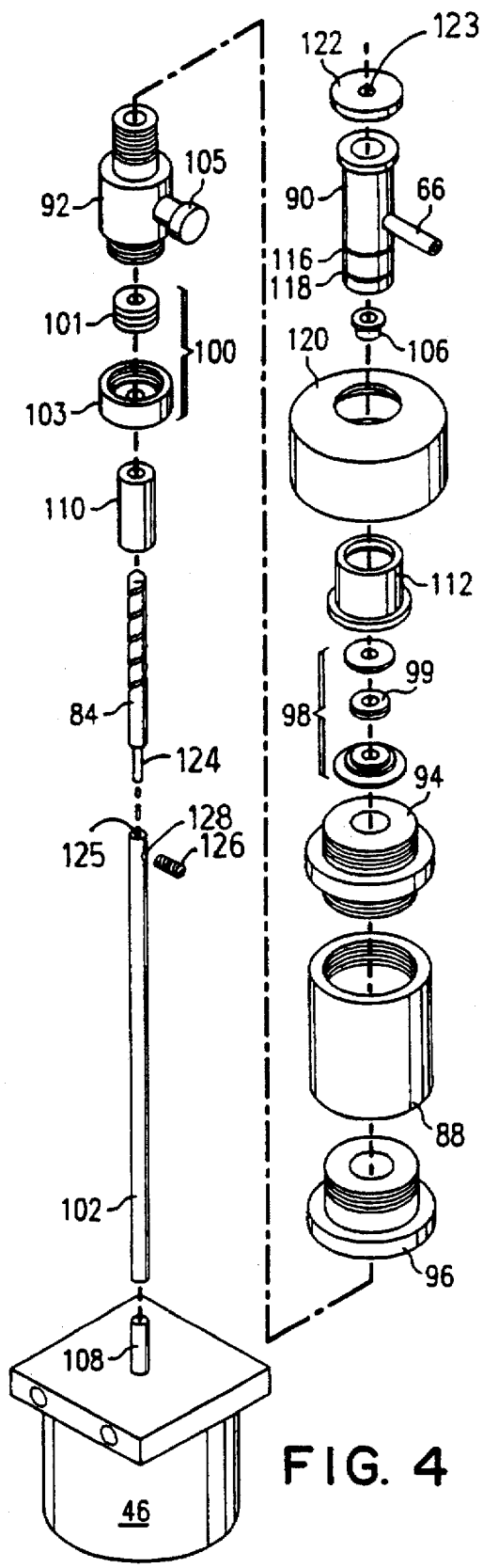
FIG. 3
FIG. 4

RUPTURE VESSEL WITH AUXILIARY PROCESSING VESSEL

This application is a continuation in part of U.S. patent application Ser. No. 08/070,709 filed May 28, 1993 entitled "Apparatus and Method for Controlled Penetration of Compressed Fluid Cylinders" now U.S. Pat. No. 5,427,157.

BACKGROUND OF THE INVENTION

1. Field of the Invention

This invention relates to the field of rupture vessels and more particularly to rupture vessels having an auxiliary processing vessel (APV) to provide, among other things, an extra measure of safety in processing containers in a rupture vessel.

2. Related Art

Cylinder rupture vessels (CRVs), such as disclosed, for example, in U.S. Pat. No. 4,690,180 entitled "Cylinder Rupture Vessel"; U.S. Pat. No. 4,944,333 entitled "Cylinder Rupture Vessel with Clamps for Immobilizing a Container Within the Vessel", and U.S. Pat. No. 5,186,219 entitled "Cylinder Rupture Vessel" enable access to the contents of cylinders (for example, cylinders with inoperable valves), munitions, drums or other containers, containing either known or unknown substances, in a controlled environment. For simplicity, the term "container" will be used herein broadly to refer to cylinders, munitions, drums or other containers containing known or unknown substances (whether pressurized or not).

The general structure and operation of a CRV is described, for example, in the aforementioned patents which are each incorporated herein by reference. Briefly, a CRV generally comprises a sealed chamber with an access door for enabling a container to be located therein on a support surface. A sealing mechanism is provided to seal the chamber. Inlet and outlet ports may be provided for creating a vacuum and/or introducing inert gas into the CRV and for purging air and inert gas from the container. A rupture mechanism is typically provided for gaining access to the inside of the container. This has been done in the past by rupturing a wall of the container using a puncture mechanism such as a punch, spike, drill, projectile or saw or by puncturing the container near the valve to remove the valve. The term "rupture" is used herein broadly to mean gaining access to the interior of the container, by penetrating a wall or portion of the container. In some prior CRV's, the container is held stationary by clamps or other securing mechanisms. It is also known to invert the container after rupturing to facilitate removal of its contents, especially when those contents are liquids.

Accessing the contents of a container in a CRV enables controlled containment of the contents of the container. To this end, the CRV may be a sealed chamber to prevent leakage of the contents and may be designed to withstand explosions should they occur in the CRV. While this arrangement works satisfactorily, improvements are possible.

In an alternative arrangement, as described in parent application Ser. No. 08/070,709, a tapping assembly may be used inside the CRV to form a seal against the container and add an extra measure of protection. While this enhances the efficacy of a CRV, additional improvements are still possible.

Overpacks, per se, are known for receiving and transporting a container. It is believed to be heretofore unknown to locate an overpack in a CRV and process a container located therein.

SUMMARY OF THE INVENTION

It is an object of this invention to provide an improved CRV.

It is another object of the present invention to provide a CRV with an APV to, among other things, increase the level of safety when processing containers in a CRV.

According to one preferred embodiment, a CRV is provided with an APV in which a container is placed. The APV is designed to permit access to the contents of a container when the APV is located within a CRV. In another embodiment, a seal is formed between the APV and a rupture mechanism. In another embodiment, a seal is formed between the rupture mechanism and a container located within an APV.

In accordance with one embodiment of the present invention, the rupture mechanism may comprise a drilling assembly for penetrating a wall of a container. The container may be supported within an APV which in turn is supported by a platform or other support structure within a CRV. The drilling assembly allows removal of a fluid from the container. The drilling assembly includes a tube for lining a first opening into the recovery vessel, as well as a first housing having an interior. A first adapter couples the housing to a first end of the tube to partially define a longitudinal bore. A shaft is rotatably disposed within the longitudinal bore. The shaft has one end for engagement with a drill bit with the other end for engagement with a motor. The drill bit is engaged to the shaft to penetrate the container wall or the APV and container wall, while the motor is engaged to the other end of the shaft. A first seal assembly forms a first fluid barrier between the interior and the longitudinal bore. A seal may be formed between the rupture mechanism (e.g. drill assembly) and the APV or between the rupture mechanism and the container.

A first technical advantage of the present invention is that it provides added levels of containment for protecting the environment from exposure to a fluid removed from a container.

A second technical advantage of the present invention is that it increases the efficiency of the process by which a hazardous fluid is removed from a container.

A third technical advantage of the present invention is that it reduces the risk of ignition of a fluid during its removal from a container.

A fourth technical advantage of the present invention is that it reduces the risk of a fluid reacting violently with surfaces exposed to the fluid during its removal from a container.

A fifth technical advantage of the present invention is that it reduces the risk of direct handling of a container in a deteriorated or otherwise unsafe condition in that it can be inserted into an APV which may be transportable, and can subsequently be processed remotely without having to first remove it from the APV. Other advantages also exist.

Other objects and advantages of the present invention will be apparent from the description of the preferred embodiments when read in conjunction with the drawings.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 is an exploded view of a drill assembly for penetrating the container of FIGS. 1 and 2; and FIG. 4 is an exploded isometric view of the drill assembly of FIG. 3.

DETAILED DESCRIPTION OF THE INVENTION

The preferred embodiment of the present invention and its advantages are best understood by referring to FIGS. 1–8 of the drawings, like numerals being used for like and corresponding parts of the various drawings.

As an overview of the present invention, a fluid recovery system 10 provides a sealed recovery vessel 12 for receiving container 14. The contents of container 14, typically hazardous waste fluids, can then be removed without polluting the environment by using recovery system 10. The pressures under which the fluid contents may be stored in container 14 can range up to approximately 6000 psi. Additionally, the fluid within container 14 may be in a gas phase, a liquid phase or a combination of both a gas and liquid phase. Typically, container 14 has been sealed shut either purposely or inadvertently, and cannot be emptied by normal procedures. After the fluid is removed from container 14, the fluid and container can be disposed of safely. Recovery system 10 allows for removal of any hazardous fluids within container 14 from a remote location to ensure the safety of personnel controlling the fluid recovery process.

Figure 1:
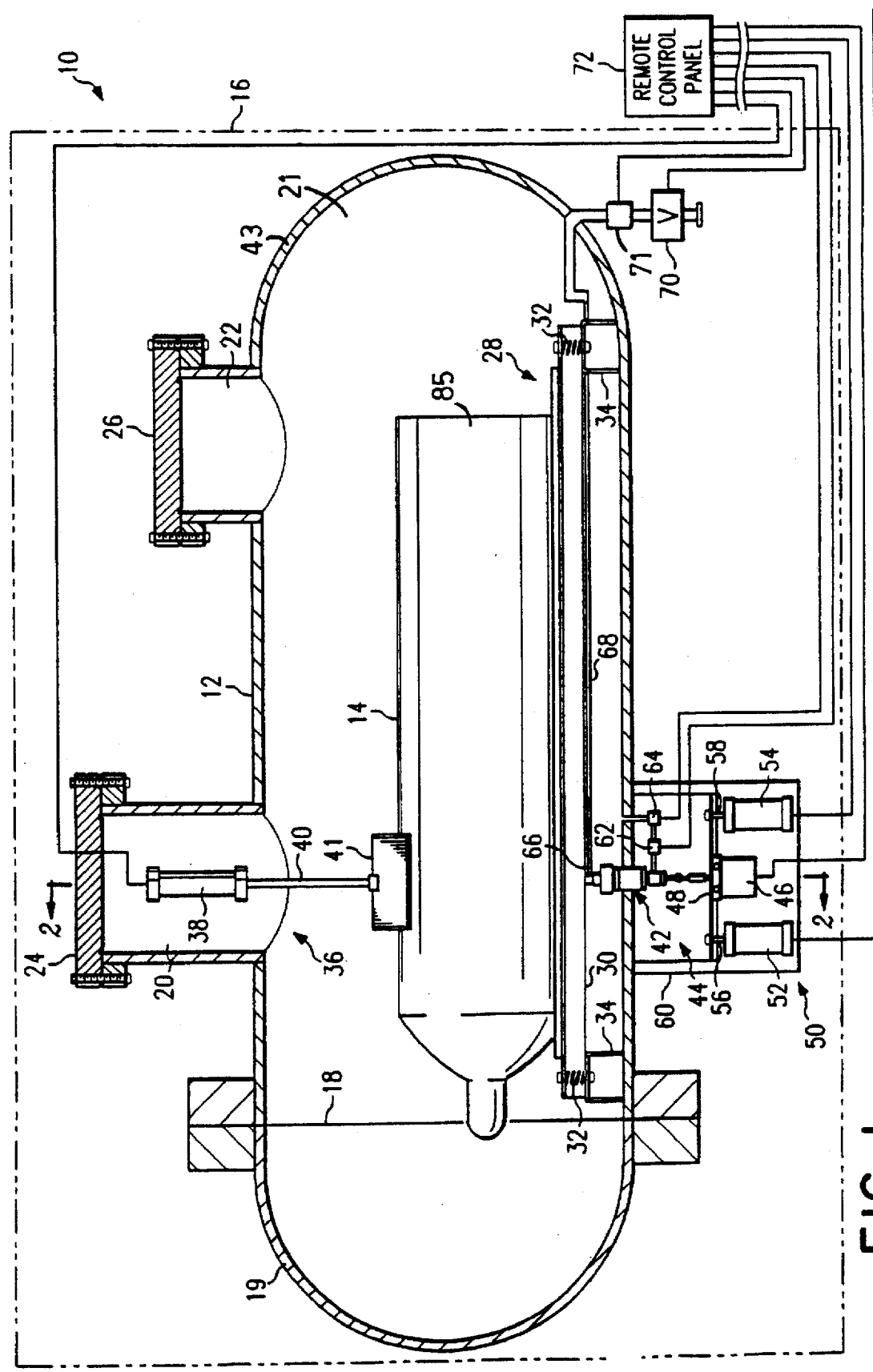
FIG. 1 is a fluid recovery system for recovering fluid from a sealed container.

More specifically, FIG. 1 is a side view of fluid recovery system 10. Fluid recovery system 10 is typically housed in a sealed trailer 16 to allow movement of fluid recovery system 10 to the location of any deteriorated containers. Thus, safety is increased by avoiding transportation of the deteriorated containers, as well as by providing an added level of containment. (The trailer being a third level, with recovery vessel 12 being a second level, and drill assembly 44 being a first level, as is discussed below.)

Fluid recovery system 10 includes a recovery vessel 12 which has a sealable end opening 18 through which container 14 may be inserted. End closure 19 is then secured to end opening 18 to seal the interior 21 of recovery vessel 12 from the environment. A fluid tight barrier is preferably maintained between the interior 21 and the exterior of recovery vessel 12.

Recovery vessel 12 also includes two access openings 20 and 22. Access openings 20 and 22 provide additional entries into interior 21 of recovery vessel 12. Closures 24 and 26 seal interior 21 from the environment when secured to access openings 20 and 22 respectively.

Although recovery vessel 12 and container 14 are shown as cylinders, various sizes, shapes and configurations of recovery vessels and containers may be satisfactorily used with the present invention.

Container 14 is placed on platform assembly 28 disposed within recovery vessel 12. Platform assembly 28 includes a platform 30 which is supported by four springs 32. Springs 32 are respectively attached to the interior of recovery vessel 12 by four support members 34. Springs 32 of platform assembly 28 allow platform 30 to move in a plane perpendicular to that of platform 30.

Fluid recovery system 10 also includes a hold-down assembly 36 having a hydraulic cylinder 38, hydraulic piston rod 40, hold-down clamp 41 and a support member (not shown) for securing hydraulic cylinder 38 to the interior portion of wall 43 of recovery vessel 12.

An opening 42 extends through wall 43 of recovery vessel 12 and provides drill assembly 44 with access to container 14. Drill assembly 44 is discussed in greater detail below in conjunction with FIGS. 3 and 4. Drill assembly 44 is driven by a drill motor 46 which is secured to motor support 48.

Drill assembly 44 and drill motor 46 are positioned relative to container 14 by drill positioning assembly 50. Drill positioning assembly 50 includes two hydraulic cylinders 52 and 54. Piston rods 56 and 58, which are positioned by cylinders 52 and 54 respectively, are coupled to motor support 48. Frame 60 secures cylinders 52 and 54 to the exterior of wall 43 of recovery vessel 12. Opening 42, drill assembly 44, motor 46, motor support 48 and drill positioning assembly 50 are preferably located on the exterior of wall 43 of recovery vessel 12 opposite from container 14 and platform 30. The specific location of opening 42 may be selected along with the location of platform assembly 28 and hold-down assembly 36 to optimize the performance of drill assembly 44 to penetrate container 44. The optimum location may vary depending upon the fluids which will be released and the type of container containing the fluids.

Hold-down assembly 36, drill positioning assembly 50, drill motor 46, valve 54 and valve 60 are all capable of being controlled remotely from remote control panel 72. Remote control panel 72 is typically located outside of trailer 16 at a distance sufficient to provide for safe operation.

Figure 2:
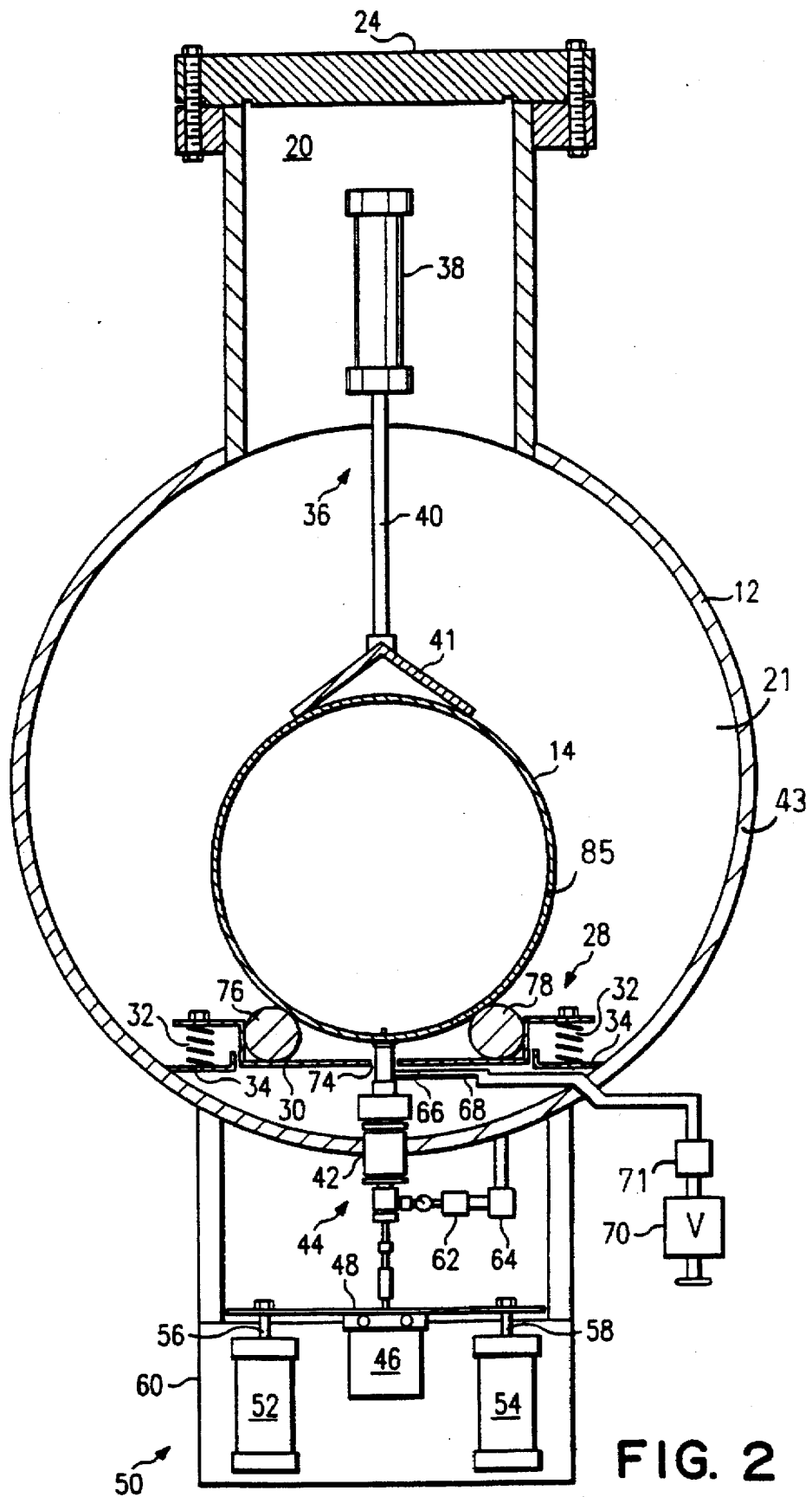
FIG. 2 is a view of the fluid recovery system of FIG. 1 along lines 2—2 of FIG. 1.

FIG. 2 shows an end view of the fluid recovery system 10 of FIG. 1 along lines 2—2. In FIG. 2 an opening 74 is shown in platform 30 to accommodate drill assembly 44. Two rails 76 and 78, which are part of platform assembly 28, are disposed along the outer edges of platform 30. Rails 76 and 78 cooperate with hold-down assembly 28 to prevent container 14 from rolling on platform 30. Drill assembly 44, motor 46, support 48 and drill positioning assembly 50 are shown disposed in another possible orientation with respect to recovery vessel 12. Such orientation does not affect the operation of fluid recovery system 10.

Referring again to FIG. 1, a pressure transducer 62 is coupled to a port 105 of drill assembly 44. A valve 64 is coupled between transducer 62 and interior 21 of recovery vessel 12. Inside recovery vessel 12, drill assembly 44 includes a cylindrical evacuation port 66 which is coupled to a pipe 68. Pipe 68 is coupled through wall 43 of recovery vessel 12 to a valve 70. A second pressure transducer 71 is also coupled to pipe 68. Pressure transducers 62 and 71 may be monitored from control panel 72. Valves 64 and 70 may be operated from control panel 72. FIG. 2 shows transducers 62 and 71, valves 64 and 70, evacuation port 66 and pipe 68 disposed in another possible orientation with respect to recovery vessel 12. Again, such orientation does not affect the operation of fluid recovery system 10.

In operation container 14 is carefully placed upon platform assembly 28 through end opening 18. End closure 19 is then closed to seal container 14 inside recovery vessel 12. Trailer 16 is sealed as well. Hydraulic cylinder 38 is activated to urge, via hydraulic piston rod 40 and hold-down clamp 41, container 14 toward platform assembly 28. Support springs 32 are compressed, allowing platform 30 to be moved toward opening 42 and drill assembly 44. Container 14 is continually urged downward until drilling assembly 44 makes sealable contact with the exterior of container 14, as shown in FIG. 2. Hold-down assembly 36 then maintains container 14 in this position.

After a fluid seal is established between drill assembly 44 and the exterior of container 14, an interior portion 80 (FIG. 3) of drill assembly 44 is filled with an inert gas. Transducer 62 monitors the pressure in a longitudinal bore 82 (FIG. 3) of drill assembly 44. If the pressure increases, a leak between interior portion 80 and longitudinal bore 82 is indicated. When such a leak occurs, drill assembly 44 must be disassembled and repaired. If no leak is detected, motor 46 is activated and rotates a drill bit 84 (FIG. 3). Drill positioning assembly 50 urges drill bit 84 forward until it makes contact with and penetrates wall 85 of container 14. Any fluid waste within container 14 may then be withdrawn through the penetration 86 via interior portion 80, evacuation port 66, pipe 68 and valve 70. By confining the fluid to the relatively small volume of interior 80, rather than the much larger volume of recovery vessel 12, the fluid removal efficiency is increased. That is, by minimizing the number of surfaces to which the fluid is exposed (the inside wall of interior 80 versus the interior side of wall 23 and the outside of wall 85), the decontamination of these surfaces is minimized.

FIG. 3 is an exploded view of drill assembly 44 as installed in FIGS. 1 and 2. Referring to FIG. 3, opening 42 in wall 43 of recovery vessel 12 is provided for installation and support of drill assembly 44. Cylindrical tubing 88 lines the inside diameter of opening 42. For this embodiment, cylindrical tubing 88 is welded within opening 42, although any other form of attachment may be used, such as threading both the outer surface of cylindrical tubing 88 and the inside diameter of opening 42.

Drill assembly 44 includes a first housing section 90 and a second housing section 92. First adapter 94 is provided to secure first housing section 90 to end 89 of tubing 88 within recovery vessel 12. Second adapter 96 is provided to secure second housing section 92 to end 91 of tubing 88 on the exterior of recovery vessel 12. A plurality of matching threads are used to attach first and second adapters 94 and 96 with their respective first housing section 90 and second housing section 92 to ends 89 and 91 of tubing 88. Housing sections 90 and 92, adapters 94 and 96 and tubing 88 cooperate with each other to define longitudinal bore 82 extending therethrough.

A first seal assembly 98, having a first packing 99, is placed on the end of first adapter 94 opposing the end threaded into tubing 88. A second seal assembly 100, having a second packing 101, is retained within second housing section 92 by packing nut 103. Second housing section 92 is threaded into the inside surface of second adapter 96. Thus, longitudinal bore 82 is formed from the interior of adapter 94, through tube 88, to the interior of adapter 96. Evacuation port 66 allows access 5 to interior 80 of housing section 90, while port 105 allows access to longitudinal bore 82.

A shaft 102 extends from the interior of first housing section 90, through bearing assembly 106, first seal assembly 98, longitudinal bore 82, and second seal assembly 100. Drill bit 84 is coupled to a drill end of shaft 102, while a drive end is coupled to motor shaft 108 by coupler 110. A coupling sleeve 112 having a lip 114 surrounds a lower portion of first housing section 90. A seal is formed between first housing section 90 and coupling sleeve 112 by two O-rings 116 and 118. The inner portion of lip 114 is disposed between one end of housing section 90 and first seal assembly 98. Quick disconnect coupling 120 engages the outer portion of lip 114 to secure sleeve 112 to first adapter 94. A portion of the interior surface of coupling 120 has threads which engage threads on the outer surface of adapter 94. A washer 122, having a center hole 123 (FIG. 4) to receive drill bit 84, is inserted between first housing section 90 and the exterior of wall 85 of container 14.

In operation, coupling 120 is tightened so that seal assembly 98 forms a first fluid barrier (by forcing packing 99 to form a seal around a first portion of shaft 102) between interior 80 of housing section 90 and longitudinal bore 82. Packing nut 103 is tightened so that seal assembly 100 forms a second fluid barrier (by forcing packing 101 to form a seal around a second portion of shaft 102) between longitudinal bore 82 and the outside environment. Hold-down assembly 36 is activated in response to a first signal from remote control panel 72. Container 14 is forced against washer 122 to form the fluid seal between housing section 90 and wall 85. In some embodiments, washer 122 is made of a material, such as lead, which allows washer 122 to conform to the contour of wall 85. In other embodiments, washer 122 is pre-formed to the contour of wall 85. The force exerted upon housing section 90 by container 14 aids in forming the first fluid barrier by further compressing packing 99.

Drill motor 46, in response to a second signal from panel 72, rotates shaft 102. Bearing assembly 106 stabilizes shaft 102 as it rotates. Drill positioning assembly 50 is activated in response to a third signal from panel 72. Drill bit 84 is urged toward container 14, as described above in conjunction with FIGS. 1 and 2, by drill positioning assembly 50 until it comes in contact with wall 85. Drill bit 84 is then further urged toward container 14 until wall 85 is penetrated to form penetration 86. Typically, an increase in pressure within pipe 68 indicates the formation of penetration 86. The pressure within pipe 68 may be obtained by remotely monitoring transducer 71 with control panel 72. Drill positioning assembly 50, in response to a fourth signal from panel 72, retracts drill bit 84 from container 14. The fluid within container 14 can be drained or pumped out of container 14 via penetration 86, evacuation port 66, pipe 68 and valve 70.

The relatively small volume of interior 80 aids in the prevention ignition of the fluid contents by minimizing the time during which the fluid escapes through penetration 86. As the fluid escapes, the friction between the fluid and the walls of penetration 86 generates heat. The longer the escape time, the higher the temperature of the portion of container wall 14 surrounding penetration 86 becomes. The temperature may become high enough to ignite the escaping fluid. The escape time is proportional to the volume into which the fluid escapes. That is, fluid, especially in a gas phase, will escape until the pressure within the escape volume reaches equilibrium with the pressure inside container 14. The smaller the volume, the more quickly such equilibrium is reached, and the lower the amount of heating which occurs. The lower the amount of heating, the less of a chance of ignition of the fluid.

A further measure which can be taken to prevent fluid ignition is to evacuate interior 80 of air via port 66 before penetration. Additionally, after evacuation is performed, interior 80 may be pressurized with an inert gas via port 66. The pressure within interior 80 is typically raised to a point above the anticipated pressure of the contents of container 14. When penetration occurs, the more highly pressurized inert gas flows through penetration 86 into container 14. Thus, if any heating occurs, it will be to the inert gas which will not ignite. If the pressure within interior 80 is less than that of the fluid inside container 14, the inert gas dilutes the escaping fluid, thus reducing the probability of ignition.

Interior 80 may be pressurized with a passivation gas when the fluid is a strong oxidizer, such as any fluorinated compound. Typically, the passivation gas consists of approximately 20% fluorine and 80% nitrogen. The passivation gas causes a thin oxidation layer to be formed on the surfaces which are exposed to the fluid once penetration of wall 85 occurs. Such surfaces include the inner surfaces of first housing section 90, port 66 and pipe 68, as well as the outer surface of drill bit 84. The thin oxidation layer prevents the strong oxidizer within container 14 from reacting with the above mentioned surfaces.

Decontamination of a fluid, such as a poison, may sometimes be necessary. Such decontamination is accomplished by injecting a decontaminate into container 14 via pipe 68, port 66, interior 80 and penetration 86.

Eradication of living organisms within the fluid may be necessary. Such eradication is accomplished by injecting a killing agent into container 14 via pipe 68, port 66, interior 80 and penetration 86.

The pressure within longitudinal bore 82 may be monitored by pressure transducer 62. If the pressure within bore 82 increases when interior 80 is filled with an inert gas or when penetration into container 14 occurs, a leak from interior 80 into bore 82, i.e., a failure of the first fluid barrier, is indicated. In the event such a leak occurs, second seal assembly 100 prevents any fluid from leaking into the environment to reestablish the first fluid barrier, first seal assembly 98 may be replaced. Alternatively, quick disconnect coupling 120 may be tightened to further compress packing 101 and reestablish the first fluid barrier. Fluid which does leak into longitudinal bore 82 is contained by second seal assembly 100 and may be redirected to interior 21 of recovery vessel 12 by opening valve 64. The leaking fluid is thereby isolated from the external environment.

In another embodiment of the drill assembly of FIG. 3, second housing section 92, second seal assembly 100, transducer 62 and valve 64 are not installed. The operation of drill assembly 44 remains the same as outlined above. However, if first seal assembly 98 fails to maintain the first fluid barrier, the fluid from container 14 may leak directly into the interior of trailer 16, as opposed to being contained by second seal assembly 100. Sealed trailer 16, however, isolates the leaking fluid from the external environment.

FIG. 4 is an exploded isometric view of the drill assembly 44 of FIG. 3. Drill bit 84 has a shank 124 for insertion into a receiving cavity 125 within the drill end of shaft 102. Shank 124 is secured within cavity 125 by set screw 126. Set screw 126 is threaded into set screw receiving hole 128. Set screw receiving hole 128 extends from the cavity to the exterior of shaft 102.

Another preferred embodiment of the present invention can be best understood by referring to FIGS. 5–9 of the drawings, like numerals being used for like and corresponding parts of the various drawings.

Figure 9:
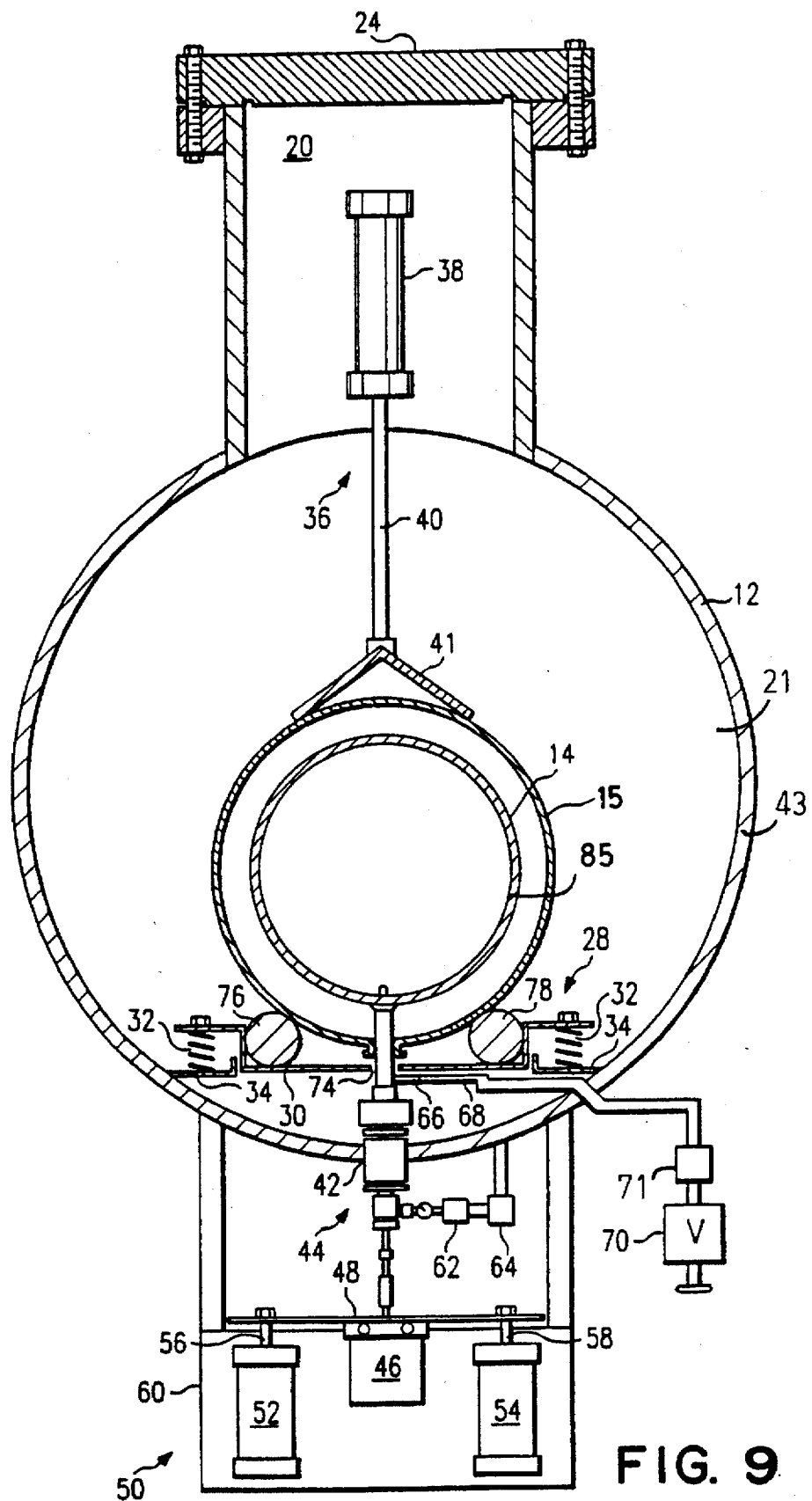
FIG. 9 is a fluid recovery system for recovering fluid from a sealed container.

In this embodiment, the fluid recovery system 10 is adapted to accept an auxiliary processing vessel assembly (APV assembly) 15 within recovery vessel 12 as generally shown, for example, in FIG. 9. The use of the APV assembly within the recovery vessel 12 provides an additional layer of protection against contamination of the environment upon release of the contents of container 14, an extra level of protection in the event of explosion and other advantages.

Figure 5:
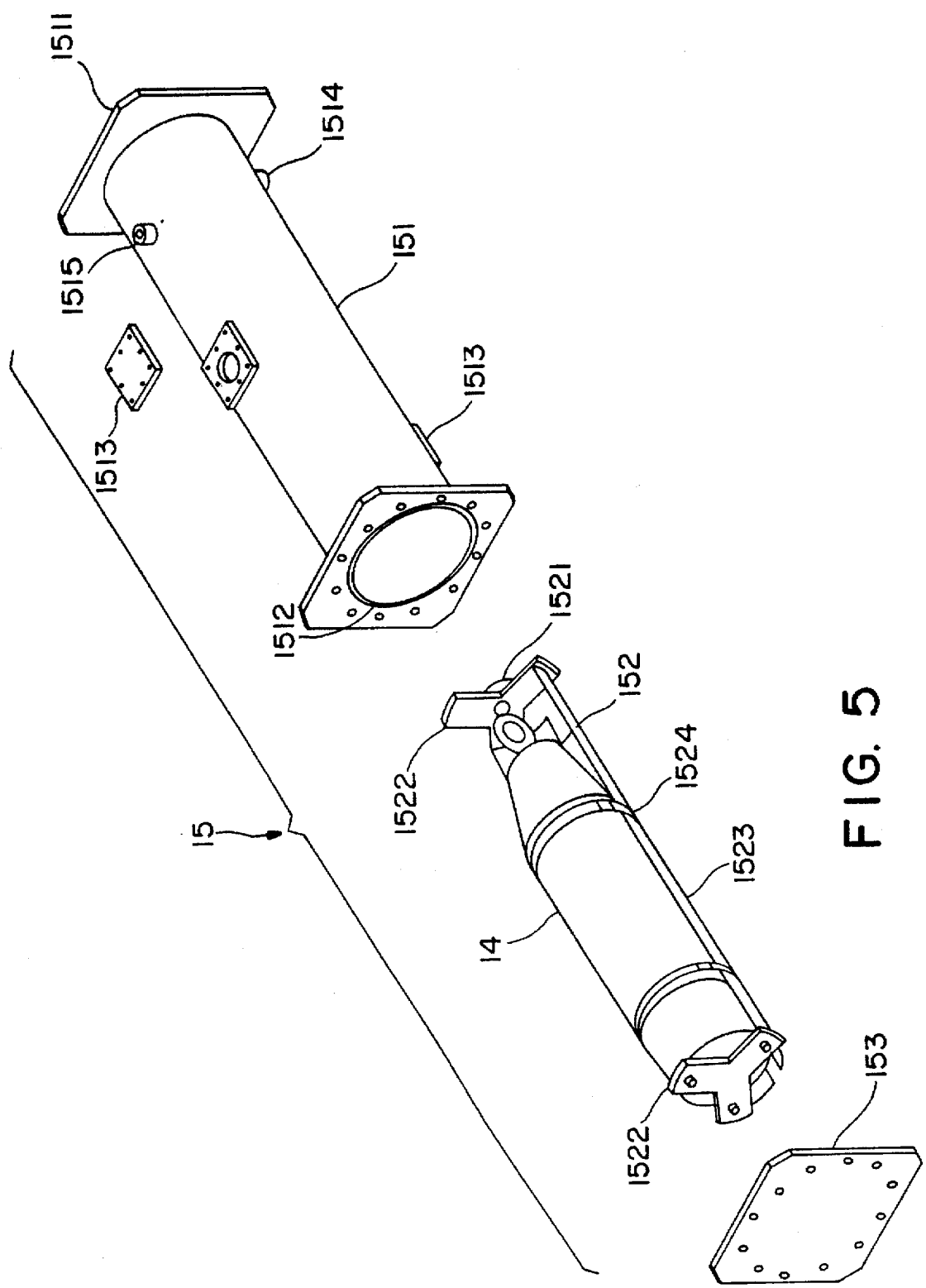
FIG. 5 is a perspective view of an auxiliary processing vessel.

An example of an APV assembly is shown in FIG. 5. The embodiment shown, includes the following components: APV overpack 151, cradle assembly 152, and end plate 153 with a gasket (not shown) or other type of sealing mechanism. The APV may be transportable and reusable. Alternatively, it may be attached to a CRV and may be slidable outwardly to receive an APV and inwardly to enable processing.

The overpack 151 is the actual protective container and can be formed of stainless steel. Overpack 151 is preferably sealed at one end 1511 and has an access opening 1512 at the opposite end which during use is sealed by end plate 153. In this manner, the APV assembly can be sealed in use. Overpack 151 may also include one or more removable drill plates 1513 with gaskets or other types of sealing mechanisms. The gasket can be a lead seal for example. The use of removable drill plates enables reuse of the APV. The drill plates allow the container 14 within the overpack 151 to be accessed for removal/neutralization of the contents of the container. The overpack 151 also can include drain well 1514 with a filter if desired. Drain well 1514 allows fluid contents of the overpack 151 to be drained. A vapor sensing port 1515 may be provided to allow investigation of the contents of the overpack, especially during the cylinder rupture process.

The APV assembly 15 also includes cradle assembly 152. Cradle assembly 152 provides a support surface for various containers and allows the container 14 to be precisely positioned or fixedly located within the overpack 151. This positioning allows the contents of container 14 to be accessed at a precise location. For example, if it is desired to position the container 14 with respect to the rupture mechanism so that the center of the container along a longitudinal axis is ruptured, the cradle assembly 152 can be adapted to ensure this positioning. Cradle assembly 152 may also have an alignment guide 1521 which, along with end plates 1522, allows for the precise positioning of the container 14 within overpack 151 by ensuring the correct positioning of the cradle 152. The cradle can be made of stainless steel pipe 1523. The container 14 can be secured in position on the cradle using steel bands 1524 or other securing mechanisms. The cradle assembly 152 may be adjustable to allow different size containers to be fixedly located within overpack 151.

The operation of this embodiment will now be broadly described. To access and drain or neutralize the contents of a container 14, the container is first positioned within APV assembly 15 and APV assembly 15 is positioned within the CRV, preferably on a support surface. Then the rupture mechanism is activated to access the contents of the container in any of a variety of ways. For example, access may be by drilling, punching, spiking, sawing or otherwise puncturing a wall or portion of the container. If desired, one or more seals may be formed prior to accessing. In this regard, the concepts described in FIGS. 1–4 may be used in conjunction with the present embodiment. For example, a drill assembly portion of a tapping assembly may be positioned to form a fluid seal to prevent escape of the contents of container 14. The contents of the container are then accessed using the tapping assembly substantially as described above. In various embodiments, the fluid seal may be formed at the interface of the tapping assembly with container 14 or at the interface with APV assembly 15, or both. Further, in an alternate embodiment, the contents of container 14 may be accessed without forming a seal. Inert gas or nitrogen may be introduced into the APV and/or CRV before processing.

Figure 6:
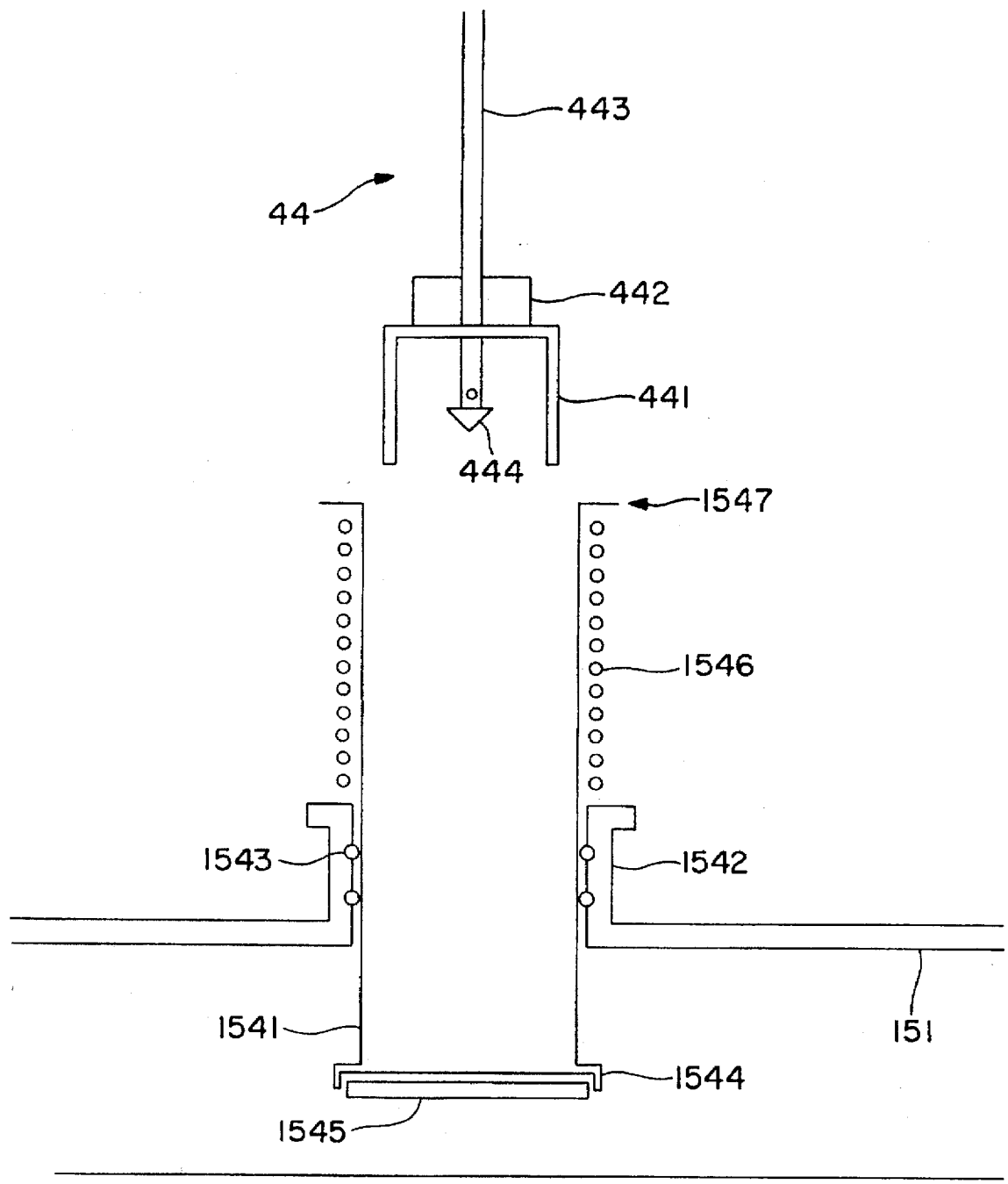
FIG. 6 is a cross-sectional view illustrating one alternative embodiment of the invention.

FIG. 6 shows an example of a preferred embodiment of a tapping assembly 44 within a CRV (not shown) and an associated APV where a fluid seal is formed at the interface of the tapping assembly and the container 14. As shown, the overpack 151 is modified to accept a piston 1541 which may be moved against the container to be accessed. The piston 1541 fits within a sealed orifice on the body of the overpack 151. This may be accomplished by installing a standard 2" threaded port, in which a threaded sleeve 1542 with grooved o-ring seals 1543 are provided. The piston preferably extends through the sleeve 1542 and is sealed by one or more o-rings 1543, or other alternate seals suitable for a smooth, cylindrical piston. Other dimensions may be used.

One end of the piston is terminated within the overpack and preferably contains a gasket retainer 1544. A gasket 1545 is installed in the retainer. The gasket may consist of a lead seal, rubber seal, or other malleable or pliable sealing material. The gasket retainer may be threaded onto the piston for easy removal and repair. Further, the retainer 1544 may form a continuous seal with the piston interior, or it may include a center hole of suitable diameter to allow a drill bit of a drill assembly (or other access mechanisms) to easily penetrate therethrough.

The end of the piston within the overpack may be curved to more readily conform with the body of cylinders or other rounded containers. It is not, however, necessary to curve the end where the gasket material is malleable or flexible, especially when the diameter of the piston is relatively small.

The end of the piston which extends outside of the overpack may include a coil spring 1546 around its circumference. The spring is held in place by a spring retainer 1547. The spring maintains the piston in the shown position until compressed by a seal cup 441 during operation. The spring retainer can be attached by threaded coupling (not shown) to the piston to facilitate installation and maintenance. An alternate embodiment of this arrangement could provide a coil spring within the overpack which would be stretched upon exertion of downward force by the seal cup 441.

The actual tapping mechanism 44 is similar to that described above in conjunction with FIGS. 2 and 3. It preferably includes a seal cup 441, a shaft seal 442, and a drill shaft 443 with an attached drill bit 444. The seal cup 441 may be extended sufficiently to enable it to extend into piston 1541 and function properly as described.

One embodiment of the seal cup incorporates an o-ring (not shown) in a groove around the circumference of its face which contacts the gasket retainer. Alternatively, the open end of the seal cup may seal directly against the gasket 1545.

The overpack 151 may include a threaded collar surrounding the outer portion of the threaded port to which a cover may be attached (not shown). This cover may be fitted to the overpack to protect the piston during movement and prior to accessing the contents of container 14. Immediately prior to operation, the cover can be removed and the open end of the piston exposed.

According to one embodiment, for accessing the contents of the container within the overpack, the open end of the piston 1541 is oriented directly under the drilling assembly and seal cup 441. The seal cup 441 is hydraulically advanced to a first position into contact with the seal or gasket retainer 1545. The seal cup 441 is then further advanced to a second position, extending the piston inward towards the target container until the gasket contacts the circumference of the target container and the gasket forms a fluid seal against the target container and the seal cup.

The adequacy of the seal can be tested by pressurizing the seal cup with an inert gas. The atmosphere within the seal cup can be removed and a vacuum created prior to drilling. When a seal has been made, the drill shaft and drill bit can be advanced. The drill bit penetrates the gasket retainer and/or the gasket and continues into the target container. The contents of the target container may then be sampled, identified, and removed in a known manner. Alternatively, processing of contents may occur in the APV while it is in the CRV. For example, a neutralizing agent may be introduced into the APV through the tapping assembly as explained herein. The container 14 may be cleaned or decontaminated by introduction of solvents or steam through the tapping assembly.

At the conclusion of the process, the seal cup 441 may be partially retracted so that the coil spring 1546 maintains sealing pressure between the seal cup 441 and gasket 1545 or gasket retainer 1544. The drill can then be left in an extended position such that it is outside of the container 14 but within the overpack 151. The space between the overpack 151 and the container 14 may then be accessed for decontamination or other processing through the hollow drill shaft of the tapping assembly.

Various advantages of this approach are that it is possible to form a seal directly against the container to allow a motive force in the form of differential pressure to be applied for removal of the container contents. This will expedite the process for viscous liquids. This system also provides additional levels of safety and containment for management of hazardous materials.

Figure 7:
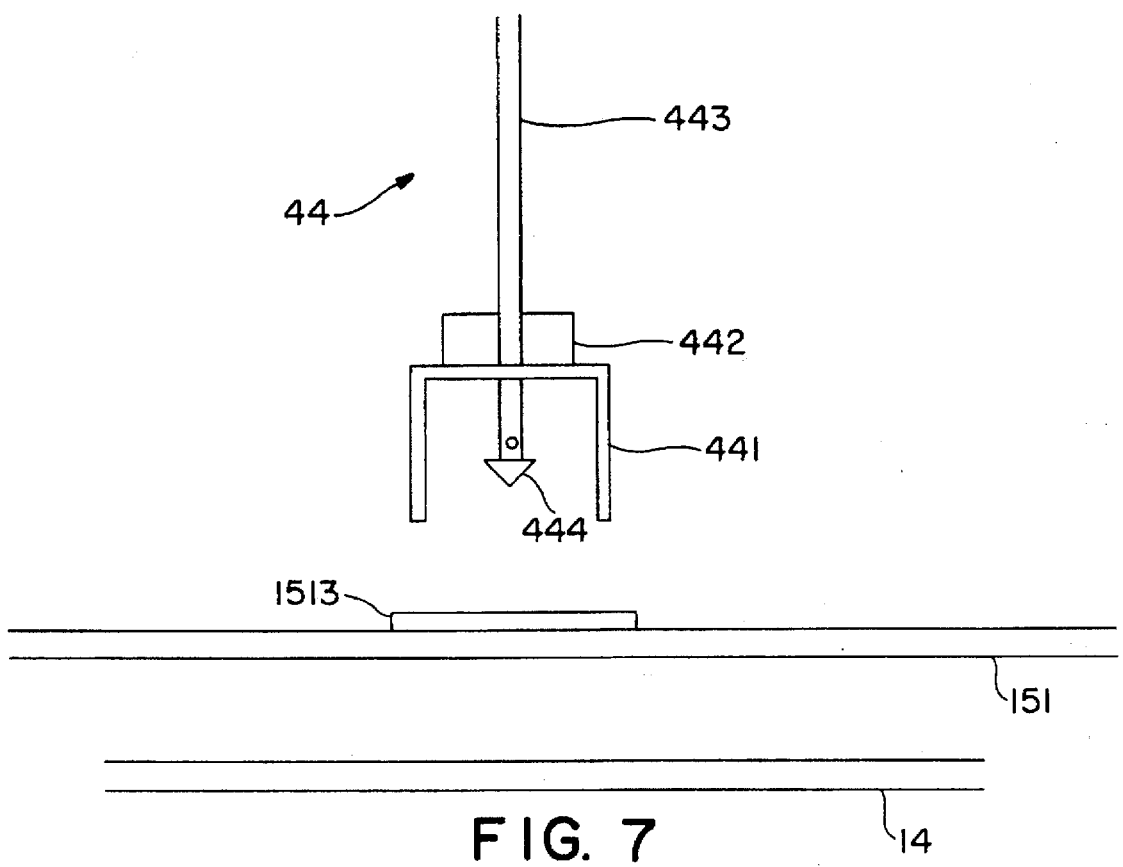
FIG. 7 is a cross-sectional view illustrating another alternative embodiment of the invention.

FIG. 7 shows an alternative embodiment in which the tapping assembly forms a seal at the interface with the APV 151. In this embodiment, the seal cup 441 engages with the drill plate 1513 or other portion of the overpack 151 and forms a fluid seal. As described above the seal may then be tested after which the drill is advanced through the overpack 151, preferably through drill plate 153. The interior of the overpack can then be evacuated before the container 14 is accessed. After penetrating the container, the process then proceeds as above with the sampling, identification, processing and removal of the contents of the container.

Figure 8:
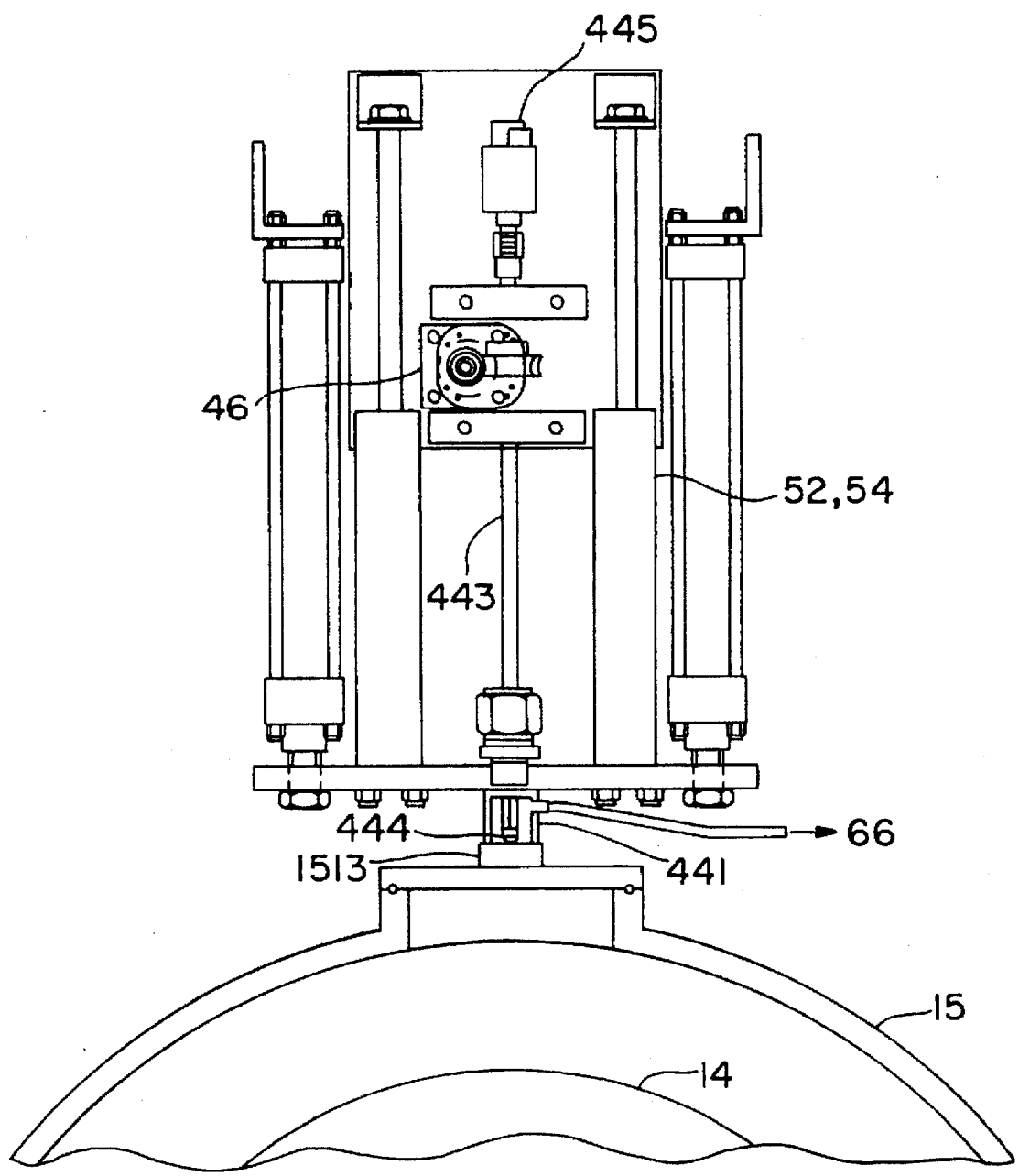
FIG. 8 illustrates a tapping assembly with an APV according to one embodiment of the present invention.

FIG. 8 illustrates a tapping assembly which may be located inside of a CRV for use with an APV having a container to be processed located therein. While one such assembly is shown in FIG. 8, two or more may be used.

In the event that an upper and lower tapping assembly is used, for example, two units substantially identical to that disclosed in FIGS. 5–8, the following procedures may be followed according to one embodiment of the invention. The upper and lower unit may be positioned against the APV 15 or container 14 to form a seal therewith. Then, the system may be pressurized to induce a positive housing pressure at the seal cup 441. Next, the rupture mechanism, for example, a drill assembly, may be activated to penetrate through the top and bottom (or either) of the APV. Next, nitrogen or an inert gas may be introduced through port 445 into the top drill assembly, which may have a hollow shaft, and processed out through the bottom drill assembly which may also have a hollow shaft to purge the interior of the APV 15. Next, the rupture mechanism is advanced and activated to penetrate the container 14 and to gain access to the contents thereof. This may be done for example by drilling through the top of container 14 and/or the bottom of the container. Further processing of the contents may be performed in a known manner.

By way of example, according to the present invention, processing may occur by opening downstream valves at the seal cup line and analyzing the contents for identification. The bottom drill may be withdrawn from the container, but the seal between the lower tapping assembly and the container may be maintained. This enables the contents of the container to be withdrawn through the bottom seal cup. Then, a neutralization fluid may be introduced through the top drill unit and withdrawn through the bottom one. If desired, steam may be injected through the top drill (and bottom drill if desired) to remove hardened residue within the container. Next, the top drill may be withdrawn from the container, but not from the APV to maintain a seal with the APV. Alternatively, the drill may be withdrawn from the container and APV and the seal may still be maintained. Neutralization fluid may be introduced through the top drill unit and withdrawn through the bottom unit to decontaminate the APV interior. Then the drill may be withdrawn from the APV and the APV removed from the CRV.

In a further alternative, the APV alone can be used to access the contents of the container 14 without the need for a CRV. In this case a fluid seal would be formed at the overpack wall and the contents of the container accessed substantially as described with respect to FIG. 7.

Specific features of the fluid recovery system of the embodiments of FIGS. 5–8 can be ascertained from the descriptions of FIGS. 1–4, the features of which can be incorporated therein.

Although a detailed description of the preferred embodiments has been provided, the scope of the invention is not limited thereby. Various changes and modifications within the scope of the invention will be readily apparent by those skilled in the art as defined by the appended claims.

What is claimed is:

1. A cylinder rupture vessel system comprising:
   a sealable structure;
   a cylinder rupture vessel having a sealable chamber, said cylinder rupture vessel locatable within the sealable structure;
   a support disposed within said sealable chamber;
   an auxiliary processing vessel locatable within said sealable chamber on said support, said auxiliary processing vessel adapted to enclose a container therein, said container having contents located therein;
   means for sealing said sealable chamber; and
   a mechanism operatively positioned within said sealable chamber for accessing said contents of said container, said mechanism comprising means for penetrating a portion of the container.

2. The cylinder rupture vessel system of claim 1, wherein said chamber further comprises:
   inlet means for introducing an inert gas into said chamber prior to accessing said contents; and
   outlet means for purging the inert gas from the chamber after accessing said contents.

3. The cylinder rupture vessel system of claim 1 further comprising means for treating the contents of said container while said contents are in said cylinder rupture vessel.

4. The cylinder rupture vessel system of claim 1 further comprising means for decontaminating said container while said container is located in said cylinder rupture vessel.

5. The cylinder rupture vessel system of claim 1 further comprising means for treating the contents of said container and decontaminating said container while said container is located in said cylinder rupture vessel.

6. The cylinder rupture vessel system of claim 1 further comprising means for immersing the container in a fluid before accessing the contents of the container.

7. The cylinder rupture vessel system of claim 1 wherein the mechanism comprises a drill assembly.

8. The cylinder rupture vessel system of claim 1 further comprising means for forming a seal between said auxiliary processing vessel and a portion of said mechanism.

9. The cylinder rupture vessel system of claim 1 further comprising means for forming a seal between said container and a portion of said mechanism.

10. The cylinder rupture vessel system of claim 1 wherein said mechanism comprises means for penetrating said auxiliary processing vessel and said container.

11. The cylinder rupture vessel system of claim 1, wherein the sealable structure comprises a sealable trailer, the cylinder rupture vessel being disposed within the sealable trailer.

12. The cylinder rupture vessel system of claim 1, wherein the auxiliary processing vessel comprises a housing having a removable portion, the contents of the container being accessed through the removable portion.

13. In a cylinder rupture vessel system comprising a cylinder rupture vessel having a sealable chamber and a mechanism for gaining access to the contents of a container located within said sealable chamber, the cylinder rupture vessel locatable within a sealable structure, a method of gaining access to the contents of said container comprising the steps of:
   enclosing the container within an auxiliary processing vessel;
   locating the auxiliary processing vessel within the sealable chamber;
   sealing the sealable chamber;
   activating the mechanism for gaining access to the contents of said container by penetrating a portion of the container.

14. The method of claim 13 further comprising the steps of:
   introducing an inert gas into said chamber prior to accessing said contents; and
   purging the inert gas from the chamber after accessing said contents.

15. The method of claim 13 further comprising the step of treating the contents of said container while said contents are in said cylinder rupture vessel.

16. The method of claim 13 further comprising the step of decontaminating said container while said container is located in said cylinder rupture vessel.

17. The method of claim 13 further comprising the step of treating the contents of said container and decontaminating said container while said container is located in said cylinder rupture vessel.

18. The method of claim 13 further comprising the step of immersing the container in a fluid before the step of activating the mechanism.

19. The method of claim 13 wherein the mechanism comprises a drill assembly.

20. The method of claim 13 further comprising the step of forming a seal between said auxiliary processing vessel and a portion of said mechanism.

21. The method of claim 13 further comprising the step of forming a seal between said container and a portion of said mechanism.

22. The method of claim 13 wherein said activating step comprises penetrating a portion of said container.

23. The method of claim 13 wherein said activating step comprises penetrating a portion of said auxiliary processing vessel and said container.

24. The method of claim 13, wherein the sealable structure comprises a sealable trailer, the cylinder rupture vessel being disposed within the sealable trailer.

25. The method of claim 13, wherein the auxiliary processing vessel comprises a housing having a removable portion, the method further comprising the step of accessing the contents of the container through the removable portion.

26. A cylinder rupture vessel system comprising:

a first sealable chamber;

a second sealable chamber, the first sealable chamber adapted to be disposed within the second sealable chamber;

a support disposed within the first sealable chamber;

an auxiliary processing vessel locatable within the first sealable chamber on the support and adapted to enclose a container therein, the container having contents located therein;

means for sealing the first and second sealable chambers; and a mechanism operatively positioned within the first sealable chamber for accessing the contents of the container, said mechanism comprising means for penetrating a portion of the container.

27. The cylinder rupture vessel system of claim 26 wherein the second sealable chamber comprises a sealable trailer.

28. The cylinder rupture vessel system of claim 26 further comprising means for forming a seal between the container and a portion of the mechanism.

29. The cylinder rupture vessel system of claims 26 further comprising means for forming a seal between the auxiliary processing vessel and a portion of the mechanism.

30. The cylinder rupture vessel system of claim 26 further comprising means for forming a seal between the first sealable chamber and a portion of the mechanism.

31. In a cylinder rupture vessel system comprising a first sealable chamber disposed within a second sealable chamber and a mechanism located within the first sealable chamber for gaining access to the contents of a container located within the first sealable chamber, a method of gaining access to the contents of said container comprising the steps of:

enclosing the container within an auxiliary processing vessel;

locating the auxiliary processing vessel within the first sealable chamber;

locating the first sealable chamber within the second sealable chamber;

sealing at least the first sealable chamber; and activating the mechanism for gaining access to the contents of the container by penetrating a portion of the container.

32. The method of claim 31 wherein the second sealable chamber comprises a sealable trailer.

33. The method of claim 31 further comprising the step of forming a seal between the container and a portion of the mechanism.

34. The method of claim 31 further comprising the step of forming a seal between the auxiliary processing vessel and a portion of the mechanism.

35. The method of claim 31 further comprising the step of forming a seal between the first sealable chamber and a portion of the mechanism.

36. A cylinder rupture vessel system comprising:

a sealable chamber;

a support disposed within the sealable chamber;

an auxiliary processing vessel locatable within the sealable chamber on the support and adapted to enclose a container therein, the container having contents located therein;

means for sealing the sealable chamber;

a mechanism operatively positioned within the sealable chamber for accessing the contents of the container; and withdrawing means located externally to the sealable chamber for withdrawing the contents from the container.

37. The cylinder rupture vessel system of claim 36 wherein the withdrawing means comprises a pump.

* * * * *